Dec. 30, 1947. F. S. WREFORD 2,433,588
WELDING CABLE
Filed May 15, 1944 3 Sheets-Sheet 1
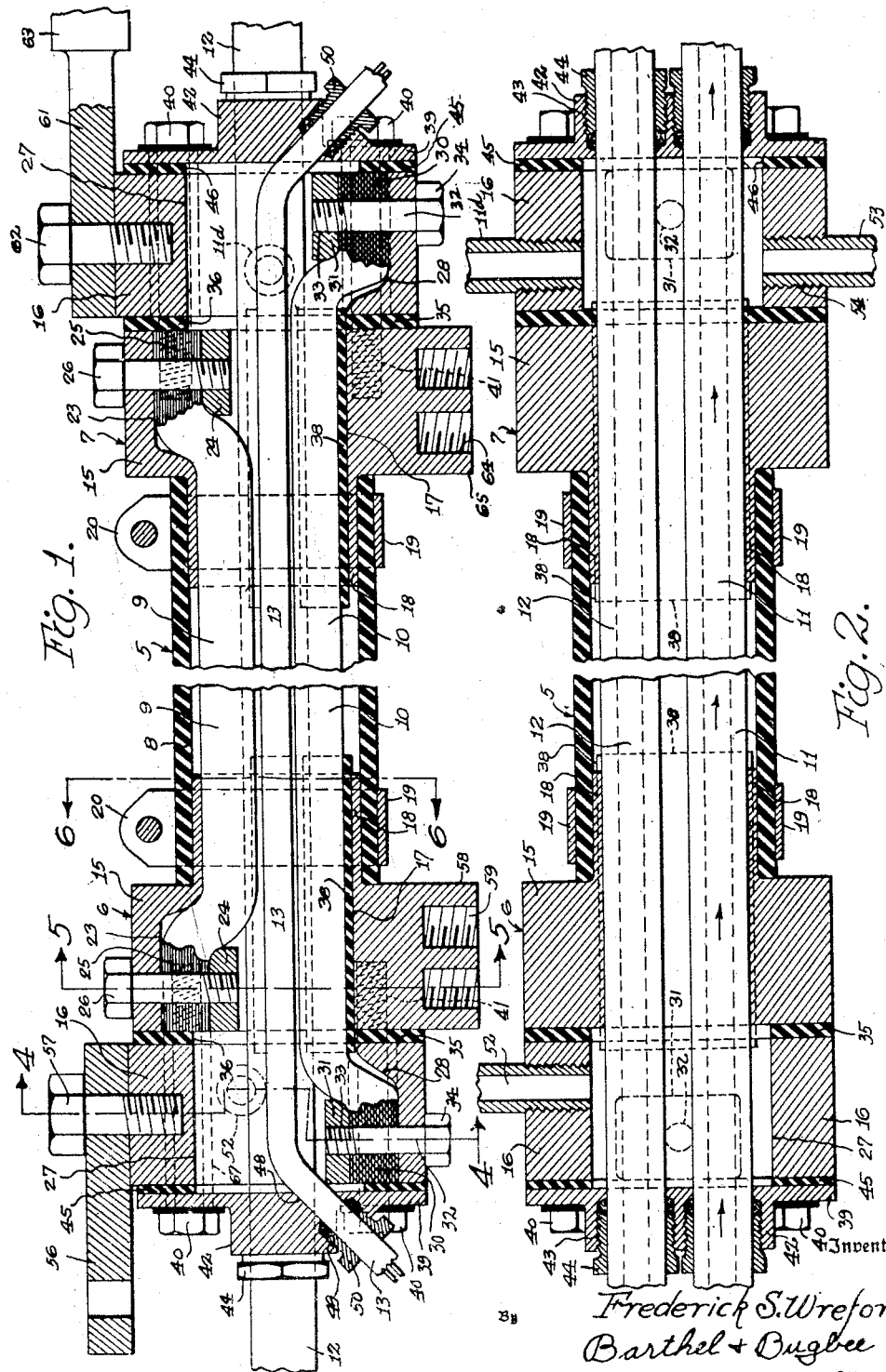
Inventor
Frederick S. Wreford
Barthel + Bugbee
Attorneys

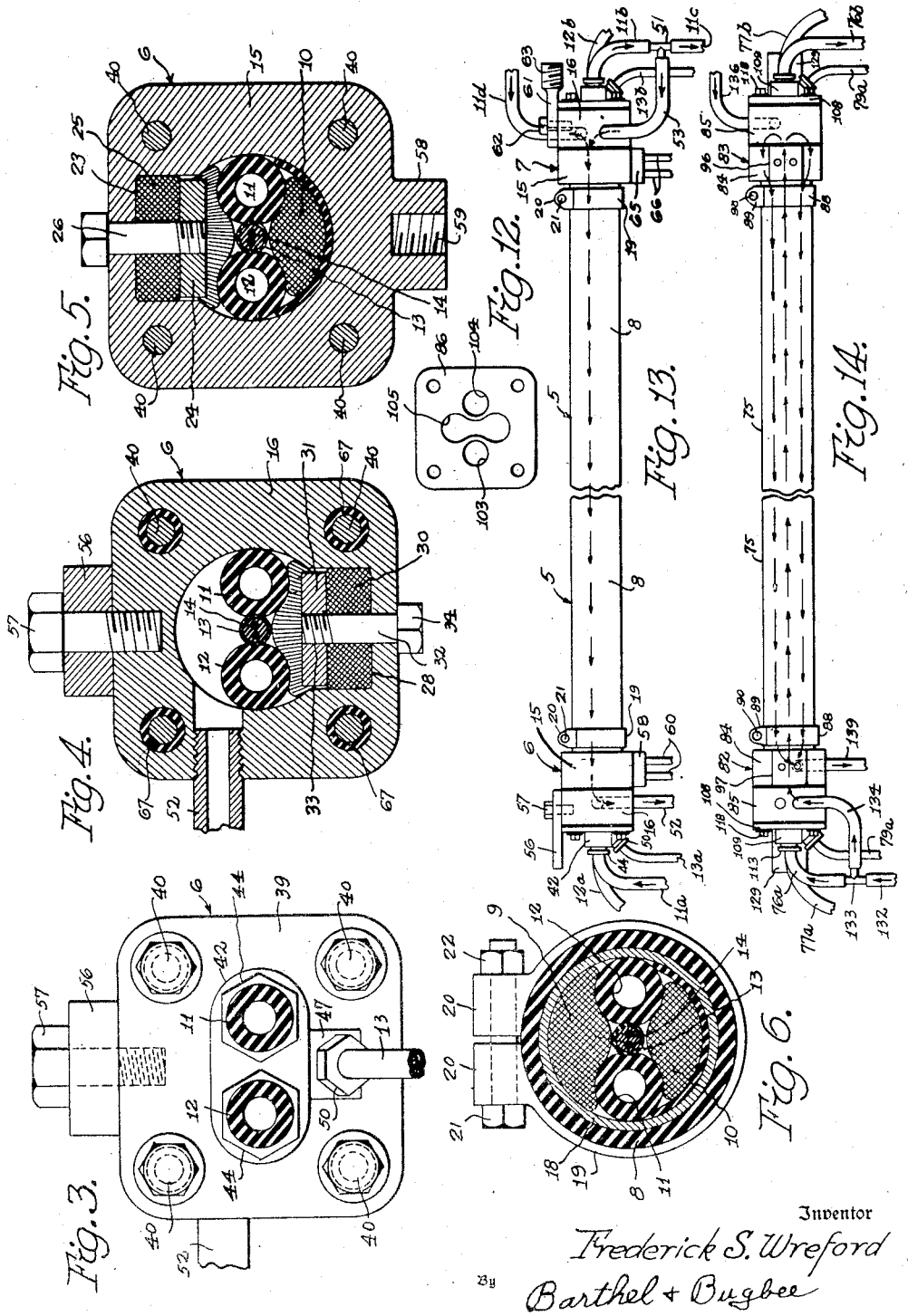

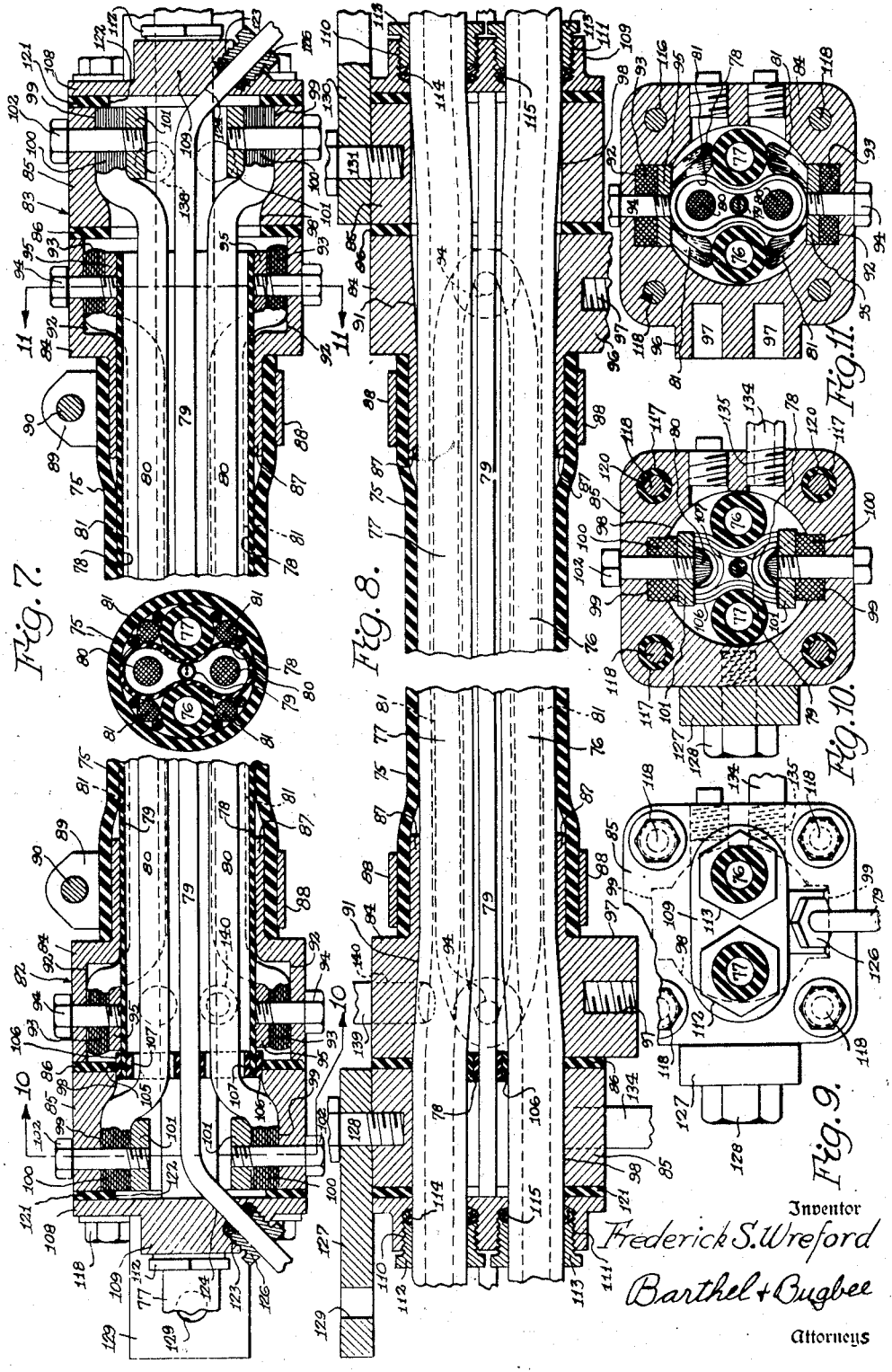

Patented Dec. 30, 1947

2,433,588

UNITED STATES PATENT OFFICE 2,433,588

WELDING CABLE

Frederick S. Wreford, Detroit, Mich.

Application May 15, 1944, Serial No. 535,592

6 Claims. (Cl. 174—15)

The present invention relates to improvements in electric cables, and more particularly to a cable for use in connection with welding equipment.

The primary object of the invention is to provide an electric cable for connecting the transformer of an electric welding set to a portable welding gun whereby all of the supply lines, conduits and conductors will be contained in said cable so as to eliminate loose lines and cables incident to the welding equipment.

Another object of the invention is to provide a welding cable of the above-mentioned character in which the air and cooling liquid supply conduits for the welding equipment are laid between the lays of the cable conductors in such a manner as to conserve space and provide a welding cable with all of the necessary conductors and conduits for supplying the welding gun with air or liquid under pressure to operate the gun, and cooling liquid for cooling the gun and cable as well as the electrical energy for producing the welding operation.

Another object of the invention is to provide a welding cable for supplying current to a portable gun type welder in which cooling liquid is circulated through the banks of cable wires so as to reduce the temperature thereof when the welding circuit is closed whereby relatively small banks of cable conductors may be employed without causing overheating of the cable and damage thereto resulting from such overheating.

Another object of the invention is to provide an electric cable for portable welding equipment having a control conductor extending through the center of said cable for controlling the welding current at the transformer end of the cable from a location adjacent the welding gun end thereof.

Another object of the invention is to provide an electric cable particularly adapted for welding equipment having air, liquid and electrical supply conductors arranged in a unique manner to permit a maximum liquid flow through the cable for cooling purposes with a portion of the cooling liquid being returned through the cable and the remaining liquid passing to the gun-type welder, whereby said cable will be more efficiently cooled by diverting a portion of the cooling liquid for being returned through the cable than by the return of the cooling liquid through the cable after being passed through the welding gun.

Another object of the invention is to provide an electric cable particularly adapted to welding equipment as set forth in the preceding objects and to provide connectors for the ends thereof to facilitate electrical connection with a welding transformer and welding type gun without employing solder or the like so that the connectors will be readily removed from the cable when one of the conductors therein has become broken and thereby permit the severing of the cable and the reinstallation of the connector without necessitating the substitution of an entire length of cable as is frequently the case when the welding cable is broken or otherwise damaged.

Another object of the invention is to provide an electrical cable particularly adapted for welding equipment having connectors at each end thereof arranged in such a manner as to provide a liquid chamber communicating with the liquid passageway through the cable to permit the cooling liquid to pass through the cable and return through the banks of conductors after reaching the cable connection at one end of the cable.

Other objects and advantages will become apparent during the course of the following description of the accompanying drawings, wherein:

Figure 1 is a longitudinal cross-sectional view of a welding cable illustrating a preferred embodiment of the invention and showing the manner in which the cable connectors are secured to each end thereof;

Figure 2 is a longitudinal cross sectional view similar to Figure 1, but taken at right angles thereto to illustrate the various positions of the conduits and electrical connectors therein;

Figure 3 is an end elevational view of one of the cable connectors showing various portions thereof broken away to illustrate the manner in which one of the electrical conductors is secured or clamped to one of the connectors and further showing the relative positions of the air and liquid conduits extending into the cable connector;

Figure 4 is a transverse cross sectional view taken on the irregular line 4—4 of Figure 1, looking in the direction of the arrows and illustrating the manner in which one of the electrical conductors is secured or clamped to one of the connectors and further showing the relative positions of the air and liquid conduits extending into the cable connector;

Figure 5 is a transverse cross sectional view taken on line 5—5 of Figure 1 looking in the direction of the arrows and illustrating the manner in which the other conductor is fastened to one of the other connectors;

Figure 6 is a transverse cross sectional view taken on line 6—6 of Figure 1, looking in the direction of the arrows illustrating the welding cable construction and the arrangement of the banks of cable wires therein;

Figure 7 is a longitudinal cross sectional view of a modified form of the invention showing a welding cable of a slightly different construction with the banks of cable wires arranged in a different order;

Figure 8 is a longitudinal cross sectional view similar to Figure 7 and taken at right angles thereto showing the manner in which the various air and liquid conduits extend through the cable and through the connectors at each end thereof;

Figure 9 is an end elevational view of one of the connectors illustrating the manner in which the air and liquid conduits extend therethrough;

Figure 10 is a transverse cross sectional view taken on line 10—10 of Figure 7 and illustrating the manner in which one of the banks of electric wires is connected to one of the connector members at one end of the cable;

Figure 11 is a transverse cross sectional view taken on line 11—11 in Figure 7 looking in the direction of the arrows and illustrating the arrangement of the other bank of electric wires and the manner in which they are electrically connected to the complementary connector member;

Figure 12 is a plan view of one of the electric separators employed at one end of the welding cable for dividing the connector sections and insulating the same while at the same time providing anchoring means for one end of the liquid conduit extending through the cable;

Figure 13 is a side elevational view of the complete cable illustrated in Figures 1 to 6 inclusive and illustrating the manner in which the connectors are secured to opposite ends of the cable and the direction of liquid flow through the various pipes associated therewith; and Figure 14 is a side elevational view of a modified form of the invention shown in Figures 1 to 12 inclusive and illustrating the manner in which the cooling liquid flows through the tube in one direction and returns from the connector at one end of the cable through the banks of conductor wires.

In the drawings, attention is directed to Figures 1 to 6 and 13 wherein there is shown a preferred embodiment of the invention and wherein the reference character 5 will generally be employed to indicate a welding cable constructed in accordance with the present invention having connectors at each end thereof generally designated by the reference characters 6 and 7. The electric cable 5 comprises an outer sheathing 8 which may be formed of canvas tubing or the like impregnated with rubber or, if desired, the sheathing may be entirely formed of rubber to provide a water-tight conduit for the various electrical conductors and other pipes incident to the welding cable.

Mounted in the sheathing 8 is a pair of electrical conductors 9 and 10 formed of a bank of electric wires either braided or twisted together to provide a compact mass and produce a conductor of the required dimensions to suit the current used in the particular welding equipment. The banks of wires 9 and 10 are twisted as usual and mounted between the lays thereof is a pair of tubular conduits 11 and 12 for conducting cooling liquid and air respectively to the various parts of the welding equipment and also used as insulation to separate and insulate the various conductors which will be hereinafter more fully described.

Mounted centrally with respect to the sheathing 8 is a control cable 13 having a pair of conductors 14 which are adapted to be connected to a switch or the like carried by the welding gun for closing a circuit through a suitable relay in the welding transformer circuit. The banks of wire conductors 9 and 10 and rubber conduits 11 and 12 are tightly held in the sheathing 8 with the control cable 13 arranged in such a fashion as to be interposed between the conduits 11 and 12 and thereby seal the space between the banks of wire conductors 9 and 10. The peripheral portions of the rubber conduits 11 and 12 are arranged so that they are in close contact with the inner surface of the sheathing 8 to similarly seal the banks of electrical wires 9 and 10 and provide a spiral cooling liquid passageway for returning the cooling liquid after a portion thereof has passed through the welding gun so as to maintain the banks of electrical conductor wires at a low temperature and prevent overheating thereof. The banks of electric wires 9 and 10 and rubber conduits 11 and 12 extend beyond the ends of the sheathing 8 for connection with the electrical connectors at the transformer end of the cable and electrical connectors at the welding gun end of the cable.

The electrical connectors 6 and 7 are substantially identical in construction and arrangement and therefore a description of one will suffice for both. These electrical connectors 6 and 7 are disclosed and claimed in my divisional application Serial No. 743,131, filed April 22, 1947, for Electric cable connector assembly. In Figures 1, 2 and 5, the electrical connectors 6 and 7 are shown as comprising a pair of castings 15 and 16 having longitudinal bores 17 for the passage of the banks of electrical wires 9 and 10 as well as the rubber conduits 11 and 12 and the control cable 13. The castings 15 are provided with tubular extensions 18 for receiving the ends of the sheathing 8 which are fastened in place by means of circular pipe clamps 19 having lugs 20 provided with aligned openings for receiving a clamping bolt 21 and a nut 22. The tubular castings have their bores 17 cut away as at 23 to provide a cable end pocket for receiving the ends of the bank of electric wires 9 as shown in Figures 1 and 5. The ends of the bank of electric wires 9 are flattened as at 25 for being received in the recesses 23 and clamping plates 24 are adapted to be clamped by means of screws or the like 26 against the ends of the bank of electric wires 9 as at 25 to hold said ends compressed within the recess 23 and establish electrical connection with the castings 15.

The castings 16 are tubular in construction and are provided with longitudinal bores 27 to facilitate the passage of the rubber conduits 11, 12 and the control cable 13 and each of the castings is provided with a recess 28 extending radially from the bore 27 for receiving the ends of the bank of electric wires 10 as indicated in Figures 1 and 4. The ends of said bank of electric wires are flattened as at 30 for reception in said recesses 28 in a manner similar to the ends 25 of the bank of electric wires 9 and said flattened ends 30 are retained in said recess 28 by means of a clamping plate 31 held in place by a clamping screw 32. The clamping screw 32 has its threaded end extending into a threaded bore 33 in said clamping plate so that when the head thereof as at 34 is turned, said clamping plate 31 will be moved into tight clamping engagement with the flattened end 30 of the bank of electric wires 10 to establish electric connection between the castings 16. The castings 15 and 16 are secured together and insulated one from the other and as shown in Figures 1 and 2, a separator 35 is interposed between the castings 15 and 16 and said separator is formed of an insulating material to insulate the castings one from the other. The insulating separators 35 are provided with openings 36 to permit the passage of the rubber conduits 11 and 12 as well as the control cable 13. Interposed between the bank of electric conductors 10 and the castings 15 is an insulating sheathing member 38 of semi-circular shape for insulating the bank of electric wires or conductors 10 from the castings 15 and thereby prevent short-circuiting of the banks of electric wires 9 and 10. The longitudinal edges of the semi-circular insulating member 38 are in contactual engagement with the rubber conduits 11 and 12 and said insulating sheathing members 38 are of a length to extend slightly beyond the inner ends of the tubular extensions 18 and have their other ends terminating in the openings 36 of the insulating shims 35 (Figure 1).

Each of the castings 16 is provided with a cover plate 39 and said cover plate is provided with openings adjacent the corners thereof for permitting the passage of connecting bolts 40 which extend through said openings and have their inner threaded ends anchored in threaded bores 41 in the castings 15. When the bolts 40 are tightened in place the castings 15 and 16 of each connector 6 and 7 are secured together to form a connector unit at each end of the cable 5. The cover plate 39 of each casting 16 is provided with a tubular extension 42 having a pair of parallel bores 43 to facilitate the passage of the rubber conduits 11 and 12. Packing gland nuts 44 are threaded in said bores 43 to provide a water-tight joint for the rubber conduits 11 and 12. In order to further seal the castings 16 against the escape of liquid, a rubber packing element 45 is interposed between the cover plate 39 and casting 16 and said insulating gasket 45 is provided with an opening 46 in registry with the opening 36 in the insulating gasket 35 to permit the passage of the rubber conduits 11 and 12 through each of the electrical connectors 6 and 7. Each of the cover plates 39 is provided with an enlarged boss 47 having a bore 48 to permit the passage of the ends of the control cable 13. The bores 48 are enlarged and screw-threaded as at 49 for receiving packing gland nuts 50 to thereby seal the conductor and cover plate 39 against escape of liquid therebetween.

It is intended to employ one of the rubber conduits 11 as a water supply conduit or coolant liquid conduit and the other of said rubber conduits as an air or hydraulic pipe for supplying fluid under pressure for moving the jaws of said welding gun (not shown) toward each other in the usual manner. As indicated in Fig. 13, water or other cooling liquid is supplied to the end of the conduit 11 as at 11a by attaching said end to a liquid circulating system including the usual pump and collection receptacle so that cooling liquid will be fed to the pump and forced through the rubber conduit 11 through the end 11a. When the cooling liquid reaches the other end of the cable and passes through the electrical connector 7, it passes out of a pipe 11b to the end thereof which is connected to a T-coupling 51 (Figure 13). A pipe line 11c connects the T-coupling 51 with a water conduit or chamber extending through the frame of the welding gun so that the cooling liquid may pass therethrough and cool said gun in a continuous manner. Usually, the welding gun is provided with an outlet and it is intended to connect said outlet to a pipe 11d connected to the casting 16 of the electrical connector 7 so that the cooling liquid returned from the gun will pass into said casting 16 of the electrical connector 7 and through the interstices of the banks of electrical wires or conductors 9 and 10 to the casting 16 of the electrical connector 6 which is fitted with an outlet pipe 52 for returning the cooling liquid to the collection chamber of the coolant circulating system. Also attached to the T-coupling 51 is a short pipe connection 53 having one end extending into the casting 16 of the electrical connector 7 and through a threaded bore thereof as at 54 so that a portion of said cooling liquid will feed back to said casting 16 of the electrical connector 7 and through the interstices of the electrical conductors or wires 9 and 10, to the casting 16 of the electrical connector 6 where it will flow through the pipe 52 and be returned to the collection chamber of the cooling liquid circulating system. A bracket arm 56 is fastened to the casting 16 of the electrical connector 6, by means of a machine screw or the like 57 so that said bracket may be affixed to the transformer of the welding system and establish electrical connection with one terminal of the secondary thereof. Similarly, the casting 15 of the electrical connector 6 which is provided with means for electrically connecting said casting to the secondary of the welding transformer and said means includes a boss 58 formed integral with the casting 16 having sockets 59 for receiving multiple conductors 60 connecting the other terminal of the transformer.

The welding gun is attached to and supported from the electrical connector 7 by means of a bracket 61 secured to the casting 16 of said electrical connector 7 by a screw or the like as at 62. One end of the bracket 61 is screw-threaded as at 63 for being received in a correspondingly threaded socket in the welding gun. In addition to supporting the welding gun, the bracket 61 establishes an electrical connection with one of the welding contacts of said gun and the other welding jaw or contact member of said gun is connected to the casting 15 of the electrical connector 7 by being received in threaded recesses 64 in a boss or the like 65 formed integral with the casting with the ends of the connecting cables as at 66 secured in position by bolts or the like.

In order to prevent the bolts 40 from electrically connecting the castings 15 and 16, said bolts are encircled with insulating tubes 67 extending through enlarged bolt openings in the casting 16. The insulating tubes 67 have their ends in engagement with the insulating gaskets 35 and 45 to further prevent the possibility of short-circuiting between said castings 15 and 16.

The air conduit 12 extends through the electrical connector 6 as at 12 for being connected to a source of compressed air and the opposite end of said air conductor in a similar manner extends through the electrical connector 7 as at 12b for attachment to the operating cylinder of said welding gun which as usual is operatively connected to the movable contact or jaw member of the welding gun to move said jaw member toward the stationary jaw member. The control cable 13 has one of its ends depending through the electrical connector 6 as at 13a for being electrically connected to a low-voltage relay in the primary circuit of the welding transformer and in a like fashion, the opposite end of the control cable 13 extends through the electrical connector 7 as at 13b for connection with a switch on the welding gun so that closing of said switch will make a circuit through the electrical conductors 14, source of current and relay switch to close the circuit in the welding transformer.

In the modified form of the invention shown in Figures 7 to 12 and 14, the welding cable comprises a sheathing 75 formed of rubber or rubberized canvas and mounted in the sheathing as illustrated in Figure 7 is a pair of rubber conductors 76 and 77 for supplying water and air to the welding gun in a manner similar to the form of the invention shown in Figures 1 to 6 and 13. A rubber tube 78 is positioned between the cooling liquid and air tubes 76 and 77 and is deformed as illustrated in section in Figure 7 by said tubes 76 and 77 to provide passageways for receiving electrical conductors. Extending through the deformed rubber tube 78 is a multi-conductor cable 79 which has its peripheral surface at diametrically opposite points thereon engaging the inner deformed walls of said tube 78. The rubber tubes 76, 77 and 78 are positioned within the cable sheathing 75 so that the peripheries of the tubes 76 and 77 engage the opposite walls of the sheathing 75 while the peripheral portions of the tube 78 engage the inner walls of said cable 75 at points at right angles to the engagement of the rubber tube. Electrical conductors 80 are mounted in the rubber tube 78 on opposite sides of the control cable 79 and said cable may be braided or formed of a series of cable wires twisted and braided in any suitable fashion.

A bank of electrical conductors 81 is arranged between the rubber tubes 76, 77 and 78 within the cable sheathing 75 to provide a return cable for the low-voltage welding current. If desired, the cables 80 or electrical conductors may be attached to the positive side of the welding transformer and the bank of electric cables 81 or conductors secured to the negative side of said transformer. The electrical conductors 80 are loosely mounted in the deformed rubber tube 78 to provide an annular chamber therebetween surrounding the electrical conductors 80. In actual construction, the rubber tubes 76 and 77 as well as the deformable rubber tube 78, will be twisted with the electrical conductors 81 mounted between the lays of said tube to permit flexing of the cable and allow the welding gun to be moved to various positions of advantage.

The electrical connectors for each end of the cable are indicated by the reference characters 82 and 83 and said connectors are similar in construction to the electrical connectors 6 and 7 shown in the form of the invention in Figures 1 to 6 and 13. The electrical connectors 82 and 83 are identical in construction and are comprised of castings 84 and 85 suitably insulated one from the other by means of insulating gaskets 86. The castings 84 are provided with a tubular extension 87 for extending into the opposite ends of the cable sheathing 75. Hose clamps 88 surround the ends of the cable sheathing for securely holding the same in place and said clamps are provided with lugs 89 adapted to be bolted together by bolts or the like as at 90. The castings 82 are provided with bores 91 having diametrically opposed cavities 92 for receiving the flattened ends 93 of the electrical conductors 81 and said conductors have their ends electrically connected to the casting 82 by means of bolts 94 and clamping plates 95. The clamping plates 95 are disposed so that the threaded openings therein may receive the threaded portions of the bolts 94 and thereby securely clamp the flattened ends 93 of the cables in position. Each of the electrical connectors 82 and 83 is formed with enlarged bosses 96 having bores 97 for receiving the cables from the welding transformer and welding gun so as to electrically connect said welding transformer and gun in a fashion similar to that disclosed in connection with the form of the invention in Figures 1 to 6 and 13.

The castings 85 of the electrical connectors 82 and 83 are likewise provided with central bores 98 having diametrically opposed recesses 99 for receiving the flattened ends 100 of the electrical conductors 81. The electrical conductors 81 are bunched together at diametrically opposite points and are held in said recesses 99 by means of clamping plates 101 and screws 102. When the screws 102 are tightened in place to clamp the locks 101 against the ends of the cables 100, electrical connection is established between said castings and said castings may be electrically connected to the transformer and welding gun of the portable welding set in a manner to be hereinafter more fully disclosed.

The insulating gasket 86 between the castings 84 and 85 of the electrical connector 82 is formed as shown in Figure 12 with a pair of openings 103 and 104 for permitting the passage of the liquid cooling air pipes 76 and 77. Further, the gasket 86 is shown in Figure 12 as being provided with an opening 105 for receiving one end of the deformed rubber tube 78 so that said tube may be fastened in place between bushings 106 and 107 with the end of said deformed tube 78 extending therebetween and securely held in position.

The castings 85 are provided with face plates 108 which are identical in form and each of said face plates is provided with an enlarged boss 109 having enlarged threaded openings 110 and 111 for permitting the passage of the rubber liquid cooling and air tubes 76 and 77 respectively. Screw-threaded packing gland nuts 112 and 113 are screw-threaded into the threaded openings 110 and 111 for compressing sealing gaskets 114 and 115 in the respective threaded bores 110 and 111 so as to completely seal the tubes against escape of liquid therearound. The castings 84 and 85 are provided with aligned openings 116 and 117 for permitting the passage of clamping bolts 118 to secure said castings together with the bores 91 and 98 thereof in registry and axial alignment. The openings 17 in the castings 85 are slightly enlarged to receive insulating tubes 120 to thereby insulate the bolts 118 and prevent short-circuiting between the various castings 84 and 85 of the electrical connectors 82 and 85. The ends of the insulating tubes or sleeves 120 engage the gaskets 86 and similar gaskets 121 formed of insulating material and interposed between the castings 85 and face plates 108. The insulating gaskets 121 are provided with circular openings 122 for allowing the free passage of the rubber tubes 76 and 77 as well as the control cable 79.

Also formed in the enlarged bosses 109 of the face plates 108 is a screw-threaded opening 123 coaxial with a diagonal bore 124 therein for permitting the passage of the ends of said control cable so that a packing material or sealing composition may be received in the threaded openings 123 and compressed into engagement with the ends of the control cable by means of gland nuts 126.

Since the electrical conductors 80 and 81 have their ends spaced and held apart by the castings 84 and 85 of the electrical connector 83, short-circuiting thereof will be prevented and in order to further insure against short-circuiting thereof, the end of the deformable tube 78 extends to a point adjacent the insulating gasket 86 of said electrical connector 83, the other end of said deformable tube as mentioned above being clamped between the bushings 106 and 107 in the type of gasket shown in Figure 12.

Secured to the casting 85 of the electrical connector 82 is a bracket 127 held in place by means of a bolt or the like 128 and said bracket extends beyond said casting and is apertured as at 129 for being connected to the transformer of the portable welding set to thereby electrically connect the casting 85 to one end of the bank of cables 81. A similar bracket arm 130 is affixed to the casting 85 and the electrical connector 83 by means of a bolt 131 and said bracket arm may have its free end attached directly to the welding gun and to the frame thereof to electrically connect the other ends of said electrical conductors 81 to one of the contacts of said welding gun.

As shown in Figure 14, a pipe 132 has one end connected to a source of water or other cooling liquid under pressure and the opposite end attached to a T-fitting 133 so as to connect the inner end 76a of the water tube with said source of cooling liquid under pressure. The other terminal of the T-fitting 133 is connected to a pipe 134 which has its opposite end threaded in an opening 135 (Figure 10) in the casting 85 of the electrical connector 82. The cooling liquid under pressure flows into the tube 76 through the cable or sheathing 5 and has its opposite end 76b connected to the cooling compartment in the welding gun frame in the conventional manner well known in the art. A pipe 136 is connected to the outlet of said cooling chamber and has its opposite end threaded in an opening 138 in the casting 85 of the electrical connector 83 so that the cooling liquid discharged from the welding gun will be returned to the casting through said pipe 136 and through the sheathing of the cable 5 to the other end thereof where it is discharged through a pipe 139 threaded in an opening 140 in the casting 84 of the electrical connector 82. The discharge pipe 139 may be connected to a source of liquid supply for returning the cooling liquid for recirculation.

The air pipe 77 has one of its ends 77a attached to a source of air under pressure and its opposite end 77b connected to the air cylinder of the welding gun. The control cable 79 has one of its ends as at 79a connected to a source of current and relay switch interposed in the primary circuit of the welding transformer in substantially the same manner as described in connection with the form of the invention shown in Figures 1 to 6 and 13. The other end of the control cable 79a is connected to a switch so that the conductors in said control cable may be attached to the contacts of said switch whereby closing of said switch will make and close a circuit through the source of current and relay switch and thereby close the primary circuit of the welding transformer, and cause current to flow through the banks of electrical cables or conductors 80 and 81 to the contacts of the welding gun. The relay switch is also adapted to close a circuit through the solenoid of a magnetically controlled valve to energize said valve and cause air under pressure from a suitable source to flow through the air pipe 77 to the air cylinder of the welding gun.

In the operation of both forms of the invention, a cable 5 (or 75) is attached in the manner above described to the welding transformer of the welding equipment with the free end of the cable attached to the welding gun to permit the gun to be moved to various locations and positions. By inspection of Figure 13, it will be noted that the cooling liquid for cooling the electrical conductors 9 and 10 flows in the direction of the arrows so that a portion of the liquid will flow during its return through and around the banks of electrical conductors 9 and 10 and thereby cool and reduce the temperature of the same during the welding operation. In a similar manner, inspection of Figure 14 will show that a portion of the cooling liquid passes through the electrical connector 82 in the direction of the arrows with part of the cooling liquid passing through the deformed tube 78 and a portion of the cooling liquid passing through the rubber hose 76 to the welding gun. When the cooling liquid reaches the electrical connector 83 it is returned through the interstices between the banks of electrical conductors 81 as well as the space between said conductors and the various rubber tubes 76, 77 and 78. The cooling liquid returning from the discharge port of the welding gun likewise passes into the electrical connector 83 and flows through the discharge end of the electrical conductors 81 and said space surrounding the deformable tube 78 as well as the space between said conductors and the rubber tubes 76 and 77.

It is to be noted that the use of solder joints and the like is eliminated in the construction and arrangement of the electrical connectors 6 and 7, 82 and 83, so that said connectors may be removed in the event that the welding cable is broken and detached by simply loosening the screws or bolts 26, 57, 94 and 102 to release said cables and permit the connectors to be affixed to the conductors at the point where they are broken or severed. In practice it is intended to silver plate the various contacting surfaces of the connectors and cables at their points of connection to insure a good electrical connection and low resistance joint.

It is to be understood that the forms of the invention herewith shown and described are to be taken as preferred embodiments of the same and that various changes may be made in the shape, size and arrangement of parts without departing from the spirit of the invention or the scope of the subjoined claims.

What I claim is:

1. A flexible cable for welding equipment, comprising a plurality of cable banks formed of twisted wire strands to form a series of electrical conductors insulated to provide a pair of electric current carrying members arranged spirally about the axis of said cable, a tubular conduit disposed within the lay of said conductors directly in contact with at least one of said electrical conductors, a control cable extending through the axis of said cable between the electrical conductors, and a sheathing surrounding said plurality of conductors and tubular conduit.

2. A flexible cable for welding equipment, comprising a plurality of cable banks of twisted wire strands to form electrical conductors insulated and arranged to provide a pair of electric current carrying conductor members, said current carrying conductor members being twisted and spirally arranged about the axis of said cable, a tubular conduit disposed within the lay of said conductors in direct engagement with at least one of said electric current carrying conductors, a sheathing surrounding said plurality of conductors and tubular conduit, an electrical connector for each end of said cable, and an electrical control wire extending through the axis of said cable.

3. A flexible cable for welding equipment, comprising a plurality of cable banks composed of twisted wire strands to form electrical conductors with certain banks insulated one from the other to provide a pair of electric current carrying members, a tubular conduit disposed within the lay of said conductors in direct contact with at least one of said current carrying members, a sheathing surrounding and slidably fitted over said plurality of conductors and tubular conduit, and a control cable for controlling the energization of the welding equipment extending through the center of said sheathing arranged between the conductors and tubular conduit.

4. A flexible cable for welding equipment comprising a plurality of cable banks composed of twisted wire strands forming electrical conductors insulated and arranged to provide a pair of electric current carrying conductor members, said electrical conductors being spirally arranged about the axis of said cable in rope lay fashion, a tubular conduit disposed within the lay of said electrical conductors in direct contact with at least one of said conductors, a sheathing surrounding said plurality of conductors and tubular conduit and slidably received thereon, an electrical connector for each end of said cable, and an electric control wire extending along the axis of said cable centrally thereof, said electrical conductors having their ends extending into cavities in the connectors and connected thereto.

5. A flexible cable for welding equipment, comprising a plurality of cable banks composed of twisted wire strands forming electrical conductors with certain banks insulated one from the other to provide a pair of electric current carrying members, a tubular conduit disposed within the lay of said conductors in direct contact with a pair of said cable banks, a sheathing surrounding said plurality of conductors and tubular conduit and slidably fitted thereover, and an electric control conductor extending along the axis and through the center of said sheathing between the conductors and tubular conduit, said control conductor being connected to the control system of the welding equipment and completely concealed within said cable.

6. A flexible cable for portable welding equipment comprising a pair of electrical current carrying conductors composed of cable banks formed of twisted wire strands, an insulating tube encircling certain of said cable banks to insulate said banks into independent conductors, a pair of tubular conduits disposed on opposite sides of said insulating tube, a sheathing enclosing said conductors and tubular conduit and arranged to deform said insulating tube to thereby form annular fluid transmission conduits surrounding said certain cable banks, and an electrical control cable extending centrally through said sheathing between the tubular conduits and completely concealed in said welding cable.

FREDERICK S. WREFORD.

REFERENCES CITED

The following references are of record in the file of this patent:

UNITED STATES PATENTS

| Number | Name | Date |
|---|---|---|
| 1,723,984 | Von Henke (1) | Aug. 6, 1929 |
| 1,853,101 | Von Henke (2) | Apr. 12, 1932 |
| 2,079,857 | Holan | May 11, 1937 |
| 2,180,731 | Dickinson | Nov. 21, 1939 |
| 2,196,523 | Eckman | Apr. 9, 1940 |
| 2,234,435 | Johnson | Mar. 11, 1941 |
| 2,241,687 | Warnke | May 13, 1941 |
| 2,247,133 | Rees | June 24, 1941 |
| 2,308,673 | Burgett | Jan. 19, 1943 |
| 2,320,470 | Rees | June 1, 1943 |